US012752912B2

(12) United States Patent
Kawauchi

(10) Patent No.: US 12,752,912 B2
(45) Date of Patent: Oct. 6, 2026

(54) FLIGHT VEHICLE

(71) Applicant: HONDA MOTOR CO., LTD., Tokyo (JP)

(72) Inventor: Ryo Kawauchi, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 19/074,485

(22) Filed: Mar. 10, 2025

(65) Prior Publication Data

US 2025/0304245 A1 Oct. 2, 2025

(30) Foreign Application Priority Data

Mar. 27, 2024 (JP) ................................ 2024-052334

(51) Int. Cl.
*B64C 25/24* (2006.01)

(52) U.S. Cl.
CPC .................................. *B64C 25/24* (2013.01)

(58) Field of Classification Search
CPC ............................... B64C 25/26; B64U 60/40
See application file for complete search history.

(56) References Cited

U.S. PATENT DOCUMENTS

2017/0101172 A1* 4/2017 Walke ..................... B64C 25/26
2017/0253323 A1* 9/2017 Green ..................... B64C 25/10
2022/0024565 A1* 1/2022 Vasudeva ................ B64C 25/26
2022/0119098 A1* 4/2022 Patel ....................... B64C 25/28
2023/0120312 A1* 4/2023 Rawdon .................. B64C 25/22
244/102 A
2024/0132204 A1* 4/2024 Dufay ..................... E05B 81/68
2025/0229894 A1* 7/2025 Doux ...................... B64C 25/18

FOREIGN PATENT DOCUMENTS

JP 2023-148642 10/2023

* cited by examiner

*Primary Examiner* — Joshua D Huson
(74) *Attorney, Agent, or Firm* — Amin, Turocy & Watson, LLP

(57) ABSTRACT

A flight vehicle of an embodiment includes: a flight vehicle main body; and a landing leg configured to be capable of transitioning between a storage state in which the landing leg is stored to a position along the flight vehicle main body and an expansion state in which the landing leg is expanded to a position away from the flight vehicle main body. The flight vehicle main body includes a first protrusion that protrudes from part of the flight vehicle main body. The landing leg includes a second protrusion that protrudes from part of the landing leg. The first protrusion and the second protrusion face each other in a direction away from the flight vehicle main body in the storage state.

20 Claims, 6 Drawing Sheets

FLIGHT VEHICLE

CROSS-REFERENCE TO RELATED APPLICATION

Priority is claimed on Japanese Patent Application No. 2024-052334, filed on Mar. 27, 2024, the contents of which are incorporated herein by reference.

BACKGROUND

Field of the Invention

The present invention relates to a flight vehicle.

Background

For example, Japanese Unexamined Patent Application, First Publication No. 2023-148642 discloses a structure that maintains a landing leg of a flight vehicle in a storage state. In this structure, by a relative movement and relative rotation of two cylinder structures, the storage state and an expansion state of the landing leg are switched.

SUMMARY

However, a movable device and/or an additional mechanism for maintaining the storage state of the landing leg are required. Therefore, a flight vehicle capable of maintaining the landing leg with a simple configuration is required.

An aspect of the present embodiment aims at providing a flight vehicle capable of maintaining a landing leg with a simple configuration.

A flight vehicle according to an aspect of the present invention includes: a flight vehicle main body; and a landing leg configured to be capable of transitioning between a storage state in which the landing leg is stored to a position along the flight vehicle main body and an expansion state in which the landing leg is expanded to a position away from the flight vehicle main body, wherein the flight vehicle main body includes a first protrusion that protrudes from part of the flight vehicle main body, the landing leg includes a second protrusion that protrudes from part of the landing leg, and the first protrusion and the second protrusion face each other in a direction away from the flight vehicle main body in the storage state.

A second aspect is the flight vehicle according to the aspect described above, wherein the first protrusion may be rotatable about a predetermined axis.

A third aspect is the flight vehicle according to the aspect described above, wherein facing between the first protrusion and the second protrusion may be released by the first protrusion rotating about the predetermined axis.

A fourth aspect is the flight vehicle according to the aspect described above, wherein the first protrusion and the second protrusion may overlap each other when seen from a direction along the predetermined axis in the storage state.

A fifth aspect is the flight vehicle according to the aspect described above which may include: a frame on an outer portion of the flight vehicle main body, wherein the first protrusion and the second protrusion may face each other at a further outer side than the frame with respect to the flight vehicle main body in the storage state.

A sixth aspect is the flight vehicle according to the aspect described above which may include: a drive portion that drives the first protrusion directly above the frame.

A seventh aspect is the flight vehicle according to the aspect described above, wherein in the storage state, an electric power may not be supplied to the drive portion.

An eighth aspect is the flight vehicle according to the aspect described above which may include: a lever that includes the first protrusion and is configured to be rotatable by a drive force of the drive portion.

A ninth aspect is the flight vehicle according to the aspect described above, wherein part of the lever may be formed in a shape along the frame directly above the frame.

A tenth aspect is the flight vehicle according to the aspect described above which may include: a bias member that biases the lever such that facing between the first protrusion and the second protrusion is maintained in the storage state.

An eleventh aspect is the flight vehicle according to the aspect described above which may include: a limit switch that detects an operation of the lever, wherein part of the limit switch may be formed in a shape along the frame.

A twelfth aspect is the flight vehicle according to the aspect described above, wherein the lever may include: a first arm on which the first protrusion is provided; and a second arm that is provided so as to be contactable with the limit switch.

A thirteenth aspect is the flight vehicle according to the aspect described above which may include: a detection portion that detects a current value of the drive portion; and a determination portion that determines a drive state of the drive portion based on a detection result of the detection portion.

A fourteenth aspect is the flight vehicle according to the aspect described above, wherein the determination portion may determine the drive state of the drive portion based on each of a detection result of the limit switch and a detection result of the detection portion.

A fifteenth aspect is the flight vehicle according to the aspect described above, wherein the drive portion may be constituted of a solenoid.

According to the first aspect described above, the flight vehicle includes: the flight vehicle main body; and the landing leg configured to be capable of transitioning between the storage state in which the landing leg is stored to the position along the flight vehicle main body and the expansion state in which the landing leg is expanded to the position away from the flight vehicle main body, wherein the flight vehicle main body includes the first protrusion that protrudes from part of the flight vehicle main body, the landing leg includes the second protrusion that protrudes from part of the landing leg, and the first protrusion and the second protrusion face each other in the direction away from the flight vehicle main body in the storage state. Thereby, the following effects are achieved.

The storage state can be maintained by the facing between the first protrusion and the second protrusion. Therefore, a movable device and/or an additional mechanism for maintaining the storage state of the landing leg is not required. Accordingly, it is possible to provide the flight vehicle capable of maintaining the landing leg with a simple configuration.

According to the second aspect described above, the first protrusion is rotatable about the predetermined axis, and thereby, the following effects are achieved.

It is possible to easily prevent the size from increasing compared to the case where the first protrusion is linearly moved (for example, the first protrusion strokes in an upward-downward direction).

According to the third aspect described above, the facing between the first protrusion and the second protrusion is released by the first protrusion rotating about the predetermined axis, and thereby, the following effects are achieved.

It becomes possible to maintain and release the storage of the landing leg by the rotation of the first protrusion.

According to the fourth aspect described above, the first protrusion and the second protrusion overlap each other when seen from the direction along the predetermined axis in the storage state, and thereby, the following effects are achieved.

Compared to the case where the first protrusion and the second protrusion do not overlap each other (the case where the first protrusion and the second protrusion are offset from each other) when seen from the direction along the predetermined axis in the storage state, it is possible to easily prevent the landing leg from flipping up in the expansion direction.

According to the fifth aspect described above, the frame is provided on the outer portion of the flight vehicle main body, and the first protrusion and the second protrusion face each other at the further outer side than the frame with respect to the flight vehicle main body in the storage state. Thereby, the following effects are achieved.

Compared to the case where the first protrusion and the second protrusion face each other at a further inner side than the frame with respect to the flight vehicle main body in the storage state, it is possible to easily ensure a space inside the frame.

According to the sixth aspect described above, by including the drive portion that drives the first protrusion directly above the frame, the following effects are achieved.

It becomes possible to maintain and release the storage of the landing leg by the drive of the first protrusion. Additionally, it is possible to ensure a space inside the frame.

According to the seventh aspect described above, in the storage state, the electric power is not supplied to the drive portion, and thereby, the following effects are achieved.

Since the electric power is not required for maintaining the storage of the landing leg, it is possible to contribute to energy saving.

According to the eighth aspect described above, by including the lever that includes the first protrusion and is configured to be rotatable by the drive force of the drive portion, the following effects are achieved.

It becomes possible to maintain and release the storage of the landing leg by the rotation drive of the lever.

According to the ninth aspect described above, part of the lever is formed in the shape along the frame directly above the frame, and thereby, the following effects are achieved.

It is possible to ensure a space inside the frame.

According to the tenth aspect described above, by including the bias member that biases the lever such that facing between the first protrusion and the second protrusion is maintained in the storage state, the following effects are achieved.

Since the electric power is not required for maintaining the storage of the landing leg, it is possible to contribute to energy saving.

According to the eleventh aspect described above, the limit switch that detects the operation of the lever is provided, and part of the limit switch is formed in the shape along the frame. Thereby, the following effects are achieved.

The operation of the lever can be detected by the limit switch. Additionally, it is possible to ensure a space inside the frame.

According to the twelfth aspect described above, the lever includes: the first arm on which the first protrusion is provided; and the second arm that is provided so as to be contactable with the limit switch, and thereby, the following effects are achieved.

The lever can have two functions (a function of maintaining and releasing the storage of the landing leg in the first arm, and a function of operating the limit switch in the second arm). Therefore, a separate component for operating the limit switch is not required. Accordingly, it is possible to realize a simpler configuration.

According to the thirteenth aspect described above, by including: the detection portion that detects the current value of the drive portion; and the determination portion that determines the drive state of the drive portion based on the detection result of the detection portion, the following effects are achieved.

It is possible to understand the drive state of the drive portion.

According to the fourteenth aspect described above, the determination portion determines the drive state of the drive portion based on each of the detection result of the limit switch and the detection result of the detection portion, and thereby, the following effects are achieved.

It is possible to determine the drive state of the drive portion by two conditions (detection of the operation of the lever by the limit switch, and detection of the current value of the drive portion by the detection portion). Therefore, it is possible to provide redundancy.

According to the fifteenth aspect described above, the drive portion is constituted of the solenoid, and thereby, the following effects are achieved.

Compared to the case where the drive portion is constituted of an electric motor (for example, a servomotor or the like), it is possible to reduce a load of control and electric power.

DESCRIPTION OF EMBODIMENTS

Figure 1:
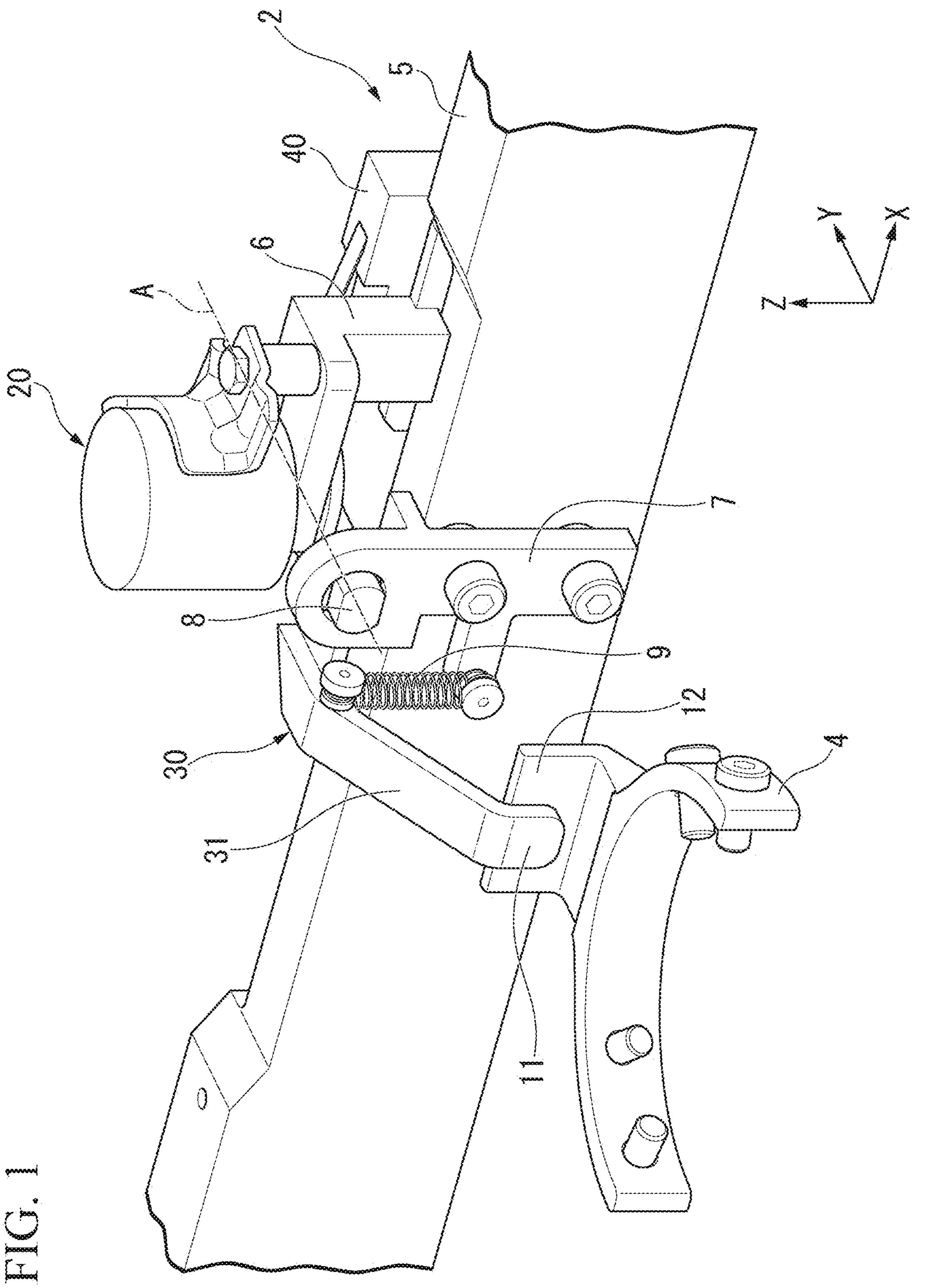
FIG. 1 is a partially enlarged perspective view of a flight vehicle of an embodiment.
Figure 2:
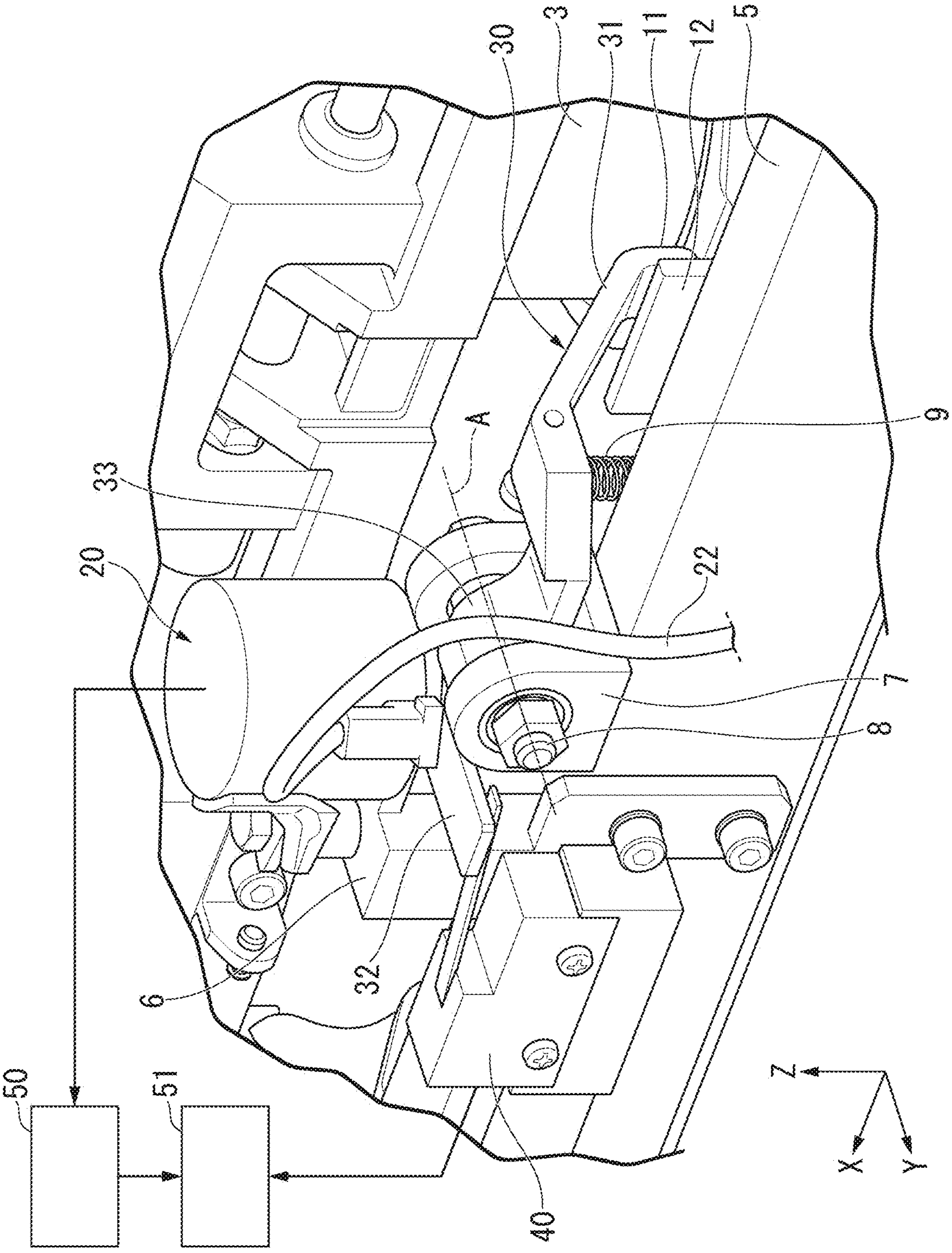
FIG. 2 is a perspective view of part of the flight vehicle of the embodiment when seen from a direction that is different from that of FIG. 1.
Figure 3:
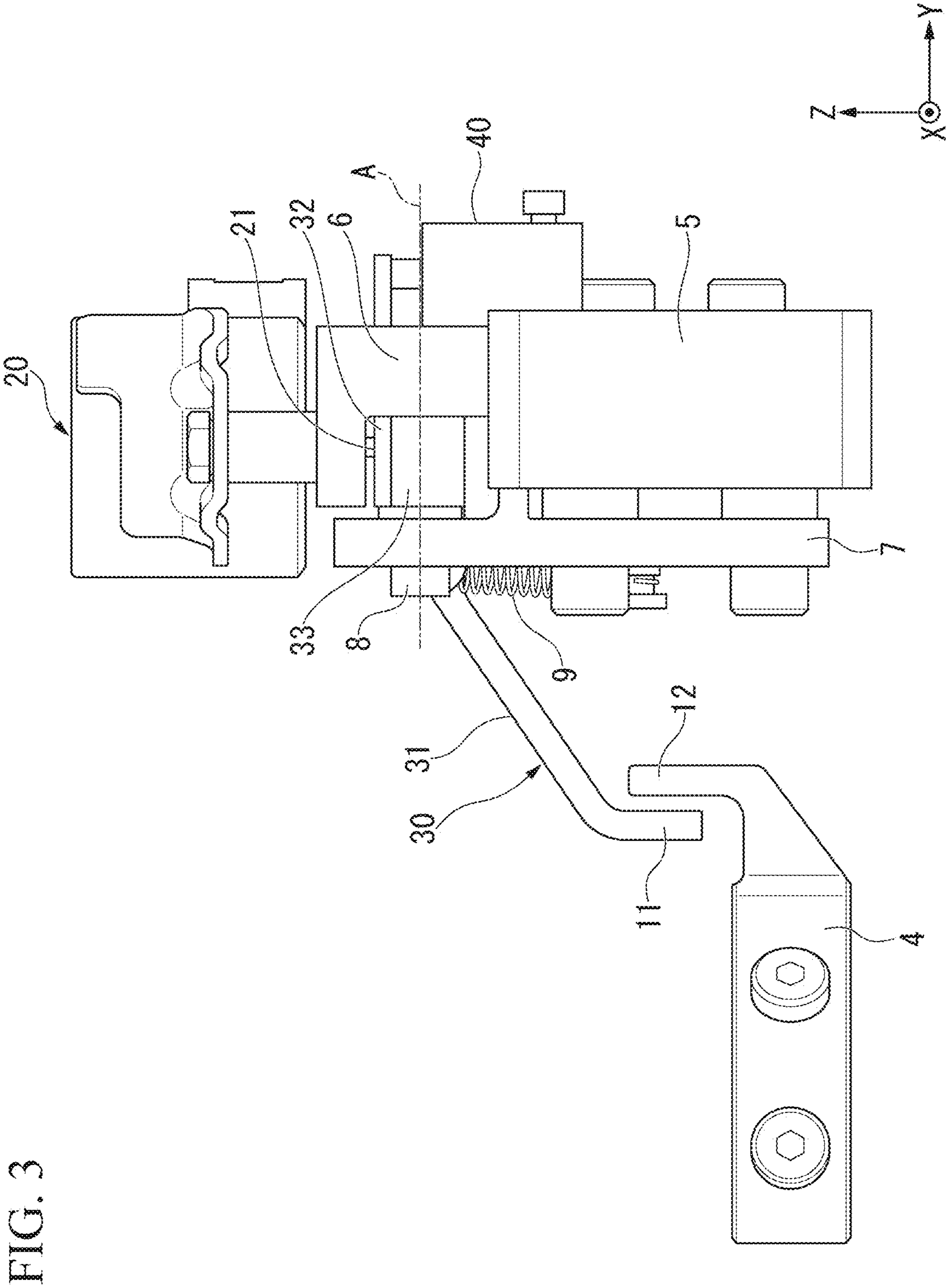
FIG. 3 is an arrangement view of a first protrusion and a second protrusion in a storage state of the embodiment.
Figure 4:
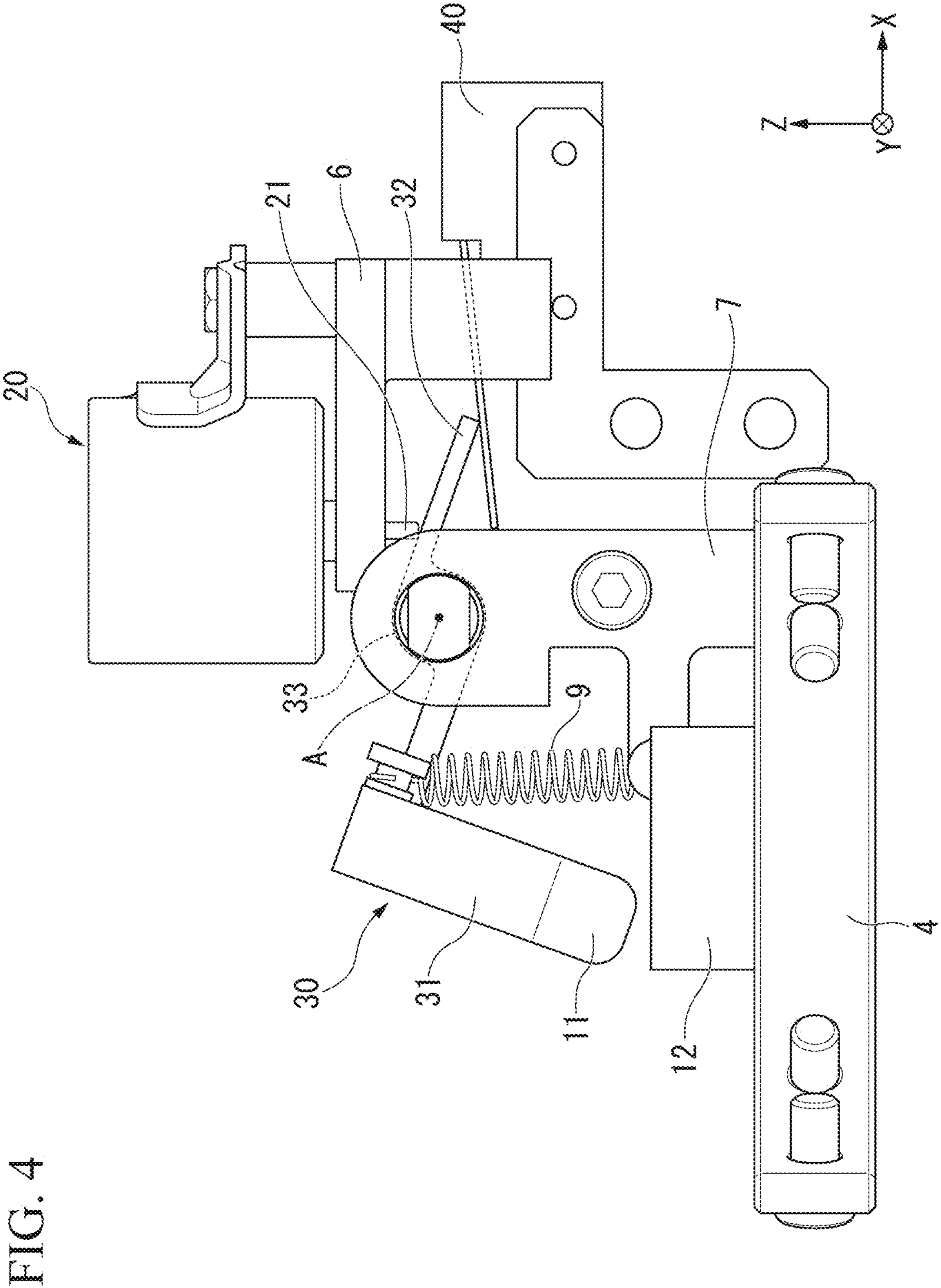
FIG. 4 is an arrangement view at the time of lever release of the embodiment.

Hereinafter, embodiments of the present invention will be described with reference to the drawings. In the following description, for example, an expression representing a relative or absolute arrangement such as “parallel”, “orthogonal”, “center”, or “coaxial” not only strictly means such an arrangement or a state but also includes an arrangement or a state of relative displacement with a tolerance or with an angle or a distance sufficient to obtain a similar function. In the drawings used for the following description, the scale size of each member may be appropriately changed such that each member is in a recognizable size.

Flight Vehicle

With reference to FIG. 1 to FIG. 6, a flight vehicle 1 includes a flight vehicle main body 2 and a landing leg 3.

The landing leg 3 has a configuration that is capable of transitioning between a storage state (refer to FIG. 6) in which the landing leg 3 is stored to a position along the flight vehicle main body 2 and an expansion state (refer to FIG. 5) in which the landing leg 3 is expanded to a position away from the flight vehicle main body 2. The flight vehicle main body 2 is connected to the landing leg 3 via a link mechanism 90.

Figure 5:
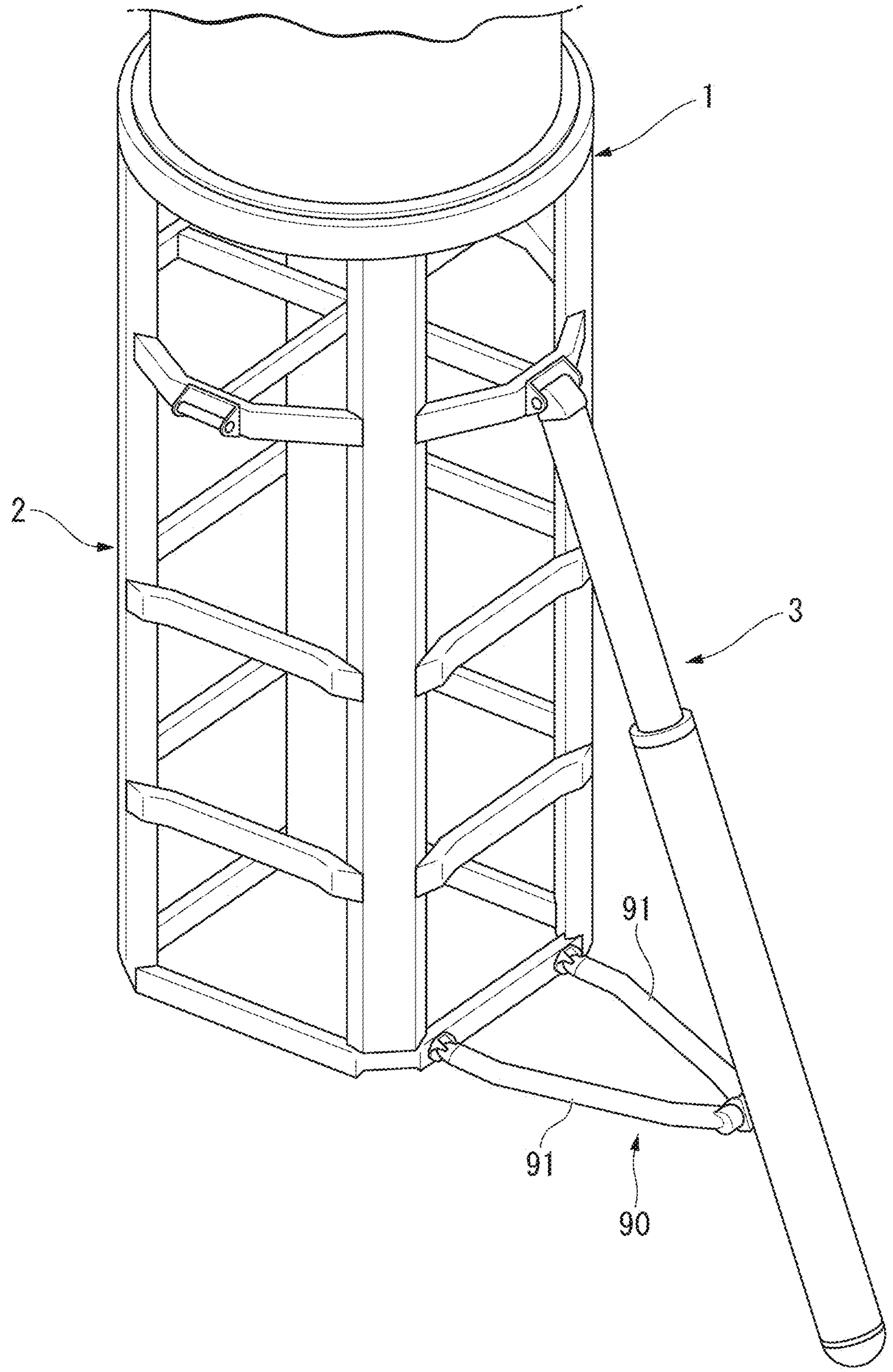
FIG. 5 is a perspective view showing an expansion state of a landing leg of the flight vehicle of the embodiment.
Figure 6:
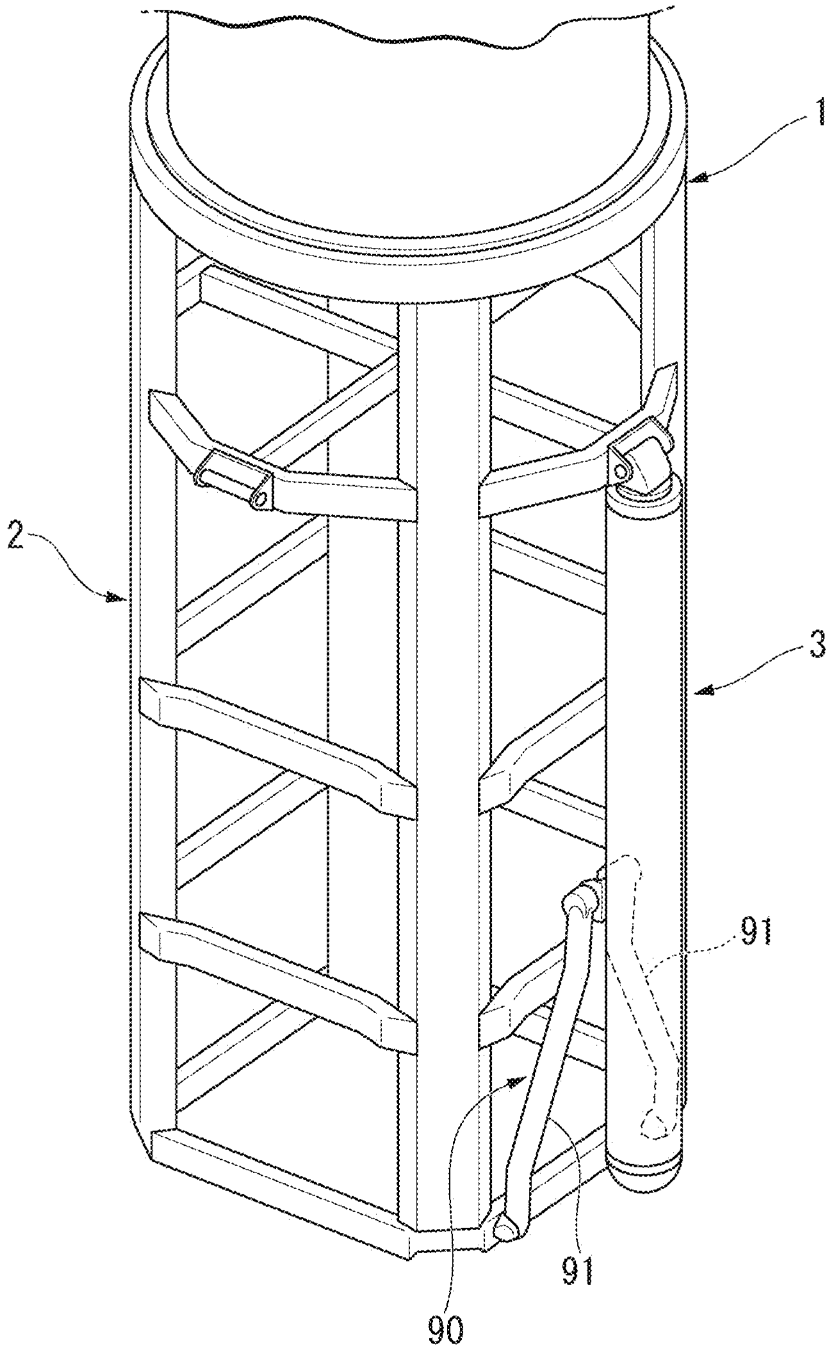
FIG. 6 is a perspective view showing a storage state of the landing leg of the flight vehicle of the embodiment.

An example of FIG. 5 shows a state where the flight vehicle 1 is standing vertically with respect to the ground. A paper surface upper side of FIG. 5 corresponds to an upper side in a vertical direction. A paper surface lower side of FIG. 5 corresponds to a lower side (ground side) in the vertical direction. The flight vehicle main body 2 extends along an upward-downward direction (vertical direction). A plurality of (for example, four) landing legs 3 are provided on the flight vehicle main body 2. In the example of FIG. 5, one of the four landing legs 3 is shown, and the other landing legs 3 are not shown.

The link mechanism 90 includes a lower beam 91 having a first end that is rotatably connected to the flight vehicle main body 2 and a second end that is rotatably connected to the landing leg 3. A pair of lower beams 91 are provided such that the first end is connected to two locations of the flight vehicle main body 2. In the expansion state, each of the pair of lower beams 91 extends outward in a horizontal direction from the first end and then extends toward the second end on the landing leg 3 side so as to approach to each other. An actuator (not shown) or the like that drives the landing leg 3 may be provided between the pair of lower beams 91. In the example of FIG. 1 to FIG. 4, a part corresponding to one landing leg 3 of the flight vehicle 1 is shown, and the other parts are not shown.

With reference to FIG. 1 to FIG. 4, the flight vehicle main body 2 includes a first protrusion 11 that protrudes from part of the flight vehicle main body 2. The landing leg 3 includes a second protrusion 12 that protrudes from part of the landing leg 3. The first protrusion 11 and the second protrusion 12 face each other in a direction away from the flight vehicle main body 2 in the storage state. The state shown in FIG. 1 to FIG. 3 corresponds to the storage state of the landing leg 3.

The first protrusion 11 is rotatable about a predetermined axis A. In the present embodiment, the first protrusion 11 rotates about the predetermined axis A, and thereby, facing between the first protrusion 11 and the second protrusion 12 is released. The state shown in FIG. 4 corresponds to a state where the facing between the first protrusion 11 and the second protrusion 12 is released.

The first protrusion 11 and the second protrusion 12 overlap each other when seen from a direction along the predetermined axis A in the storage state. In the example of FIG. 1, the second protrusion 12 protrudes from part of a bracket 4 that is attached to the landing leg 3. Part of the second projection 12 is arranged between an outer portion (frame 5) of the flight vehicle main body 2 and the first protrusion 11 in the storage state. Thereby, the movement of the second protrusion 12 in a direction away from the flight vehicle main body 2 is restricted in the storage state.

In the present embodiment, the frame 5 is provided on an outer portion of the flight vehicle main body 2. The first protrusion 11 and the second protrusion 12 face each other at a further outer side than the frame 5 with respect to the flight vehicle main body 2 in the storage state.

In the following description, a XYZ orthogonal coordinate system is used as needed. The X direction corresponds to a direction (longitudinal direction) in which the frame 5 extends. The Y direction corresponds to a thickness direction of the frame 5. The Z direction corresponds to a height direction (shorter direction) that is orthogonal to each of the longitudinal direction (X direction) and the thickness direction (Y direction) of the frame 5. In the following description, an arrow side in the drawing of the X direction, the Y direction, and Z direction is defined as a plus (+) side, and an opposite side of the arrow is defined as a minus (−) side. The +X side corresponds to one side in the longitudinal direction, and the −X side corresponds to another side in the longitudinal direction.

The frame 5 extends in the X direction, for example, so as to connect two support pillars adjacent to each other among a plurality of support pillars (not shown) that extend in the Z direction. The frame 5 may be arranged at a position that corresponds to a side portion (linear portion of a rectangular frame shape) of a quadrangle when seen from the Z direction. In the example of the drawing, the first protrusion 11 and the second protrusion 12 face each other at a −Y side further than the frame 5 in the storage state.

In the present embodiment, a drive portion 20 that drives the first protrusion 11 is provided directly above frame 5.

Part of the drive portion 20 overlaps the frame 5 when seen from the Z direction. Part of the drive portion 20 is formed in a column shape along the Z direction. The drive portion 20 is supported by a stay 6. The stay 6 is connected to the frame 5. The stay 6 is fixed to the frame 5 by, for example, a fastening member such as a bolt. For example, a wiring 22 for supplying electric power may be connected to the drive portion 20.

The drive portion 20 is constituted of a solenoid. The drive portion 20 includes a plunger 21 (movable iron core) that is movable in the Z direction. For example, when the electric power is supplied to the drive portion 20, the plunger 21 moves to the −Z side further than an initial position. When the electric power is not supplied to the drive portion 20, the plunger 21 moves to the +Z side (returns to the initial position). In the present embodiment, the electric power is not supplied to the drive portion 20 in the storage state.

In the present embodiment, a lever 30 that includes the first protrusion 11 and has a configuration which is rotatable by a drive force of the drive portion 20 is provided. The lever 30 is supported by a holder 7. The lever 30 is supported rotatably about a pin 8 with respect to the holder 7. The holder 7 is connected to the frame 5. The holder 7 is fixed to the frame 5 by, for example, a fastening member such as a bolt.

The pin 8 is provided on a portion of the holder 7 on a +Z side further than the frame 5. Both end portions in the Y direction of the pin 8 are supported (supported at both sides) by a portion that is spaced apart in the Y direction in the holder 7.

Part of the lever 30 is formed in a shape along the frame 5 directly above the frame 5.

Part of the lever 30 overlaps the frame 5 when seen from the Z direction.

In the present embodiment, a bias member 9 that biases the lever 30 such that facing between the first protrusion 11 and the second protrusion 12 is maintained in the storage state is provided. The bias member 9 is, for example, a coil spring. One end of the bias member 9 is attached to part of the lever 30. Another end of the bias member 9 is attached to part of the holder 7.

In the present embodiment, a limit switch 40 that detects an operation of the lever 30 is provided. Part of the limit switch 40 is formed in a shape along the frame 5. Part of the limit switch 40 is formed in a shape having a longitudinal direction in the X direction. The limit switch 40 is provided on a −Y side of the frame 5. The limit switch 40 is fixed to the frame 5 by, for example, a fastening member such as a bolt.

The lever 30 includes: a first arm 31 on which the first protrusion 11 is provided; and a second arm 32 that is provided so as to be contactable with the limit switch 40. The lever 30 includes an insertion portion 33 through which the pin 8 is inserted between the first arm 31 and the second arm 32.

The first arm 31 extends from the insertion portion 33 to the −X side and then extends obliquely toward the −Y side and the −Z side. The first protrusion 11 is provided on a −Z end portion of the first arm 31. One end of the bias member 9 is attached to a +Z side portion (a portion close to the insertion portion 33) of the first arm 31.

The second arm 32 extends from the insertion portion 33 to the +X side and then extends toward the +Y side.

A +Y end portion of the second arm 32 is provided so as to be contactable with the limit switch 40. The plunger 21 is contactable with a +Z side portion (a portion close to the insertion portion 33) of the second arm 32.

In the present embodiment, in the storage state of the landing leg 3, electric power is not supplied to the drive portion 20. In the storage state, the plunger 21 of the drive portion 20 is at an initial position. In the storage state, the lever 30 is biased by the bias member 9 such that facing between the first protrusion 11 and the second protrusion 12 is maintained. By the biasing, the first protrusion 11 and the second protrusion 12 face each other in the Y direction in the storage state (refer to FIG. 1 and FIG. 3).

On the other hand, when the storage state of the landing leg 3 is released, electric power is supplied to the drive portion 20. When the electric power is supplied to the drive portion 20, the plunger 21 of the drive portion 20 moves to the −Z side further than the initial position. The plunger 21 rotates the lever 30 (rotates the lever 30 clockwise when seen from the −Y direction) about the predetermined axis A against a biasing force of the bias member 9. According to this rotation, the facing in the Y direction between the first protrusion 11 and the second protrusion 12 is released (refer to FIG. 4). At this time, the second arm 32 comes into contact with the limit switch 40, and thereby, the limit switch 40 is operated.

In the present embodiment, a detection portion 50 that detects a current value of the drive portion 20 and a determination portion 51 that determines a drive state of the drive portion 20 based on a detection result of the detection portion 50 are provided.

The determination portion 51 constitutes a control device (not shown). The determination portion 51 determines the drive state of the drive portion 20 on the basis of each of the detection result of the limit switch 40 and the detection result of the detection portion 50.

The determination portion 51 determines the drive state of the drive portion 20 by two conditions (detection of the operation of the lever 30 by the limit switch 40, and detection of the current value of the drive portion 20 by the detection portion 50). The detection of the operation of the lever 30 by the limit switch 40 corresponds to that the second arm 32 comes into contact with the limit switch 40. The detection of the current value of the drive portion 20 by the detection portion 50 corresponds to that the current value of the drive portion 20 detected by the detection portion 50 exceeds a predetermined threshold value.

Action and Effect

As described above, the flight vehicle 1 in the embodiment described above includes: the flight vehicle main body 2; and the landing leg 3 configured to be capable of transitioning between the storage state in which the landing leg 3 is stored to the position along the flight vehicle main body 2 and the expansion state in which the landing leg 3 is expanded to the position away from the flight vehicle main body 2. The flight vehicle main body 2 includes the first protrusion 11 that protrudes from part of the flight vehicle main body 2. The landing leg 3 includes the second protrusion 12 that protrudes from part of the landing leg 3. The first protrusion 11 and the second protrusion 12 face each other in the direction away from the flight vehicle main body 2 in the storage state.

According to this configuration, the storage state can be maintained by the facing between the first protrusion 11 and the second protrusion 12. Therefore, a movable device and/or an additional mechanism for maintaining the storage state of the landing leg 3 is not required. Accordingly, it is possible to provide the flight vehicle capable of maintaining the landing leg 3 with a simple configuration.

In the embodiment described above, the first protrusion 11 is rotatable about the predetermined axis A.

According to this configuration, it is possible to easily prevent the size from increasing compared to the case where the first protrusion 11 is linearly moved (for example, the first protrusion 11 strokes in an upward-downward direction).

In the embodiment described above, the facing between the first protrusion 11 and the second protrusion 12 is released by the first protrusion 11 rotating about the predetermined axis A.

According to this configuration, it becomes possible to maintain and release the storage of the landing leg 3 by the rotation of the first protrusion 11.

In the embodiment described above, the first protrusion 11 and the second protrusion 12 overlap each other when seen from the direction along the predetermined axis A in the storage state.

According to this configuration, compared to the case where the first protrusion 11 and the second protrusion 12 do not overlap each other (the case where the first protrusion 11 and the second protrusion 12 are offset from each other) when seen from the direction along the predetermined axis A in the storage state, it is possible to easily prevent the landing leg 3 from flipping up in the expansion direction.

In the embodiment described above, the frame 5 is provided on the outer portion of the flight vehicle main body 2. The first protrusion 11 and the second protrusion 12 face each other at the further outer side than the frame 5 with respect to the flight vehicle main body 2 in the storage state.

According to this configuration, compared to the case where the first protrusion 11 and the second protrusion 12 face each other at a further inner side than the frame 5 with respect to the flight vehicle main body 2 in the storage state, it is possible to easily ensure a space inside the frame 5.

In the embodiment described above, the drive portion 20 that drives the first protrusion 11 is provided directly above the frame 5.

According to this configuration, it becomes possible to maintain and release the storage of the landing leg 3 by the drive of the first protrusion 11. Additionally, it is possible to ensure a space inside the frame 5.

In the embodiment described above, in the storage state, the electric power is not supplied to the drive portion 20.

According to this configuration, since the electric power is not required for maintaining the storage of the landing leg 3, it is possible to contribute to energy saving.

In the embodiment described above, the lever 30 that includes the first protrusion 11 and is configured to be rotatable by the drive force of the drive portion 20 is provided.

According to this configuration, it becomes possible to maintain and release the storage of the landing leg 3 by the rotation drive of the lever 30.

In the embodiment described above, part of the lever 30 is formed in the shape along the frame 5 directly above the frame 5.

According to this configuration, it is possible to ensure a space inside the frame 5.

In the embodiment described above, the bias member 9 that biases the lever 30 such that facing between the first protrusion 11 and the second protrusion 12 is maintained in the storage state is provided.

According to this configuration, since the electric power is not required for maintaining the storage of the landing leg 3, it is possible to contribute to energy saving.

In the embodiment described above, the limit switch 40 that detects the operation of the lever 30 is provided. Part of the limit switch 40 is formed in the shape along the frame 5.

According to this configuration, the operation of the lever 30 can be detected by the limit switch 40. Additionally, it is possible to ensure a space inside the frame 5.

In the embodiment described above, the lever 30 includes: the first arm 31 on which the first protrusion 11 is provided; and the second arm 32 that is provided so as to be contactable with the limit switch 40.

According to this configuration, the lever 30 can have two functions (a function of maintaining and releasing the storage of the landing leg 3 in the first arm 31, and a function of operating the limit switch 40 in the second arm 32). Therefore, a separate component for operating the limit switch 40 is not required. Accordingly, it is possible to realize a simpler configuration.

In the embodiment described above, the detection portion 50 that detects the current value of the drive portion 20 and the determination portion 51 that determines the drive state of the drive portion 20 based on the detection result of the detection portion 50 are provided.

According to this configuration, it is possible to understand the drive state of the drive portion 20.

In the embodiment described above, the determination portion 51 determines the drive state of the drive portion 20 on the basis of each of the detection result of the limit switch 40 and the detection result of the detection portion 50.

According to this configuration, it is possible to determine the drive state of the drive portion 20 by two conditions (detection of the operation of the lever 30 by the limit switch 40, and detection of the current value of the drive portion 20 by the detection portion 50). Therefore, it is possible to provide redundancy.

In the embodiment described above, the drive portion 20 is constituted of the solenoid.

According to this configuration, compared to the case where the drive portion 20 is constituted of an electric motor (for example, a servomotor or the like), it is possible to reduce the load of control and electric power.

Modification Example

The above embodiment is described using an example in which the first protrusion is rotatable about the predetermined axis; however, the embodiment is not limited thereto. For example, the first protrusion may be capable of moving linearly (for example, stroking upward and downward). The mode in which the first protrusion moves can be changed in accordance with a design specification.

The above embodiment is described using an example in which the first protrusion rotates about the predetermined axis, and thereby, facing between the first protrusion and the second protrusion is released; however, the embodiment is not limited thereto. For example, the first protrusion may move linearly (for example, stroke upward and downward), and thereby, facing between the first protrusion and the second protrusion may be released. The mode in which facing between the first protrusion and the second protrusion is released can be changed in accordance with a design specification.

The above embodiment is described using an example in which the first protrusion and the second protrusion overlap each other when seen from a direction along the predetermined axis in the storage state; however, the embodiment is not limited thereto. For example, the first protrusion and the second protrusion may not overlap each other (may be offset from each other) when seen from the direction along the predetermined axis in the storage state. The arrangement mode in the storage state of the first protrusion and the second protrusion can be changed in accordance with a design specification.

The above embodiment is described using an example in which the frame is provided on the outer portion of the flight vehicle main body, and the first protrusion and the second protrusion face each other at a further outer side than the frame with respect to the flight vehicle main body in the storage state; however, the embodiment is not limited thereto. For example, the first protrusion and the second protrusion may face each other at a further inner side than the frame with respect to the flight vehicle main body in the storage state. The arrangement mode of the first protrusion and the second protrusion relative to the frame can be changed in accordance with a design specification.

The above embodiment is described using an example in which the drive portion that drives the first protrusion is provided directly above the frame; however, the embodiment is not limited thereto. For example, the drive portion that drives the first protrusion may be provided at a side of the frame. The placement mode of the drive portion relative to the frame can be changed in accordance with a design specification.

The above embodiment is described using an example in which in the storage state, the electric power is not supplied to the drive portion; however, the embodiment is not limited thereto. For example, in the storage state, the electric power may be supplied to the drive portion. The mode in which the electric power is supplied to the drive portion can be changed in accordance with a design specification.

The above embodiment is described using an example in which the lever that includes the first protrusion and is configured to be rotatable by the drive force of the drive portion is provided; however, the embodiment is not limited thereto. For example, the first protrusion may be provided on a separate member from the lever. The configuration mode of the lever can be changed in accordance with a design specification.

The above embodiment is described using an example in which part of the lever is formed in a shape along the frame directly above the frame; however, the embodiment is not limited thereto. For example, the entire lever may be arranged at a side of the frame. The arrangement mode of the lever relative to the frame and/or the shape of the lever can be changed in accordance with a design specification.

The above embodiment is described using an example in which the bias member that biases the lever such that facing between the first protrusion and the second protrusion is maintained in the storage state is provided; however, the embodiment is not limited thereto. For example, the bias member may bias the lever such that facing between the first protrusion and the second protrusion is released in the storage state. In this case, a press member or the like (a separate member from the bias member) that presses the lever such that facing between the first protrusion and the second protrusion is maintained in the storage state may be provided, or facing between the first protrusion and the second protrusion may be maintained by a drive force of the drive portion. The placement mode of the bias member and/or the mode in which facing between the first protrusion and the second protrusion is maintained in the storage state can be changed in accordance with a design specification.

The above embodiment is described using an example in which the limit switch that detects the operation of the lever is provided, and part of the limit switch is formed in a shape along the frame; however, the embodiment is not limited thereto.

For example, a sensor that detects the operation of the lever may be provided. The placement mode of the limit switch relative to the frame and/or the shape of the limit switch can be changed in accordance with a design specification.

The above embodiment is described using an example in which the lever includes: the first arm on which the first protrusion is provided; and the second arm that is provided so as to be contactable with the limit switch; however, the embodiment is not limited thereto. For example, two types of levers (a first lever having a function of maintaining and releasing the storage of the landing leg, and a second lever having a function of operating the limit switch) may be provided. For example, a separate component for operating the limit switch may be provided. The configuration mode of the lever can be changed in accordance with a design specification.

The above embodiment is described using an example in which the detection portion that detects the current value of the drive portion and the determination portion that determines the drive state of the drive portion on the basis of the detection result of the detection portion are provided; however, the embodiment is not limited thereto. For example, a sensor that detects an operation of the plunger of the drive portion (solenoid) may be provided. The placement mode of the detection portion and/or the determination portion can be changed in accordance with a design specification.

The above embodiment is described using an example in which the determination portion determines the drive state of the drive portion on the basis of each of the detection result of the limit switch and the detection result of the detection portion; however, the embodiment is not limited thereto. For example, the drive state of the drive portion may be determined by one condition (any one of a condition that the limit switch detects the operation of the lever and a condition that the detection portion detects the current value of the drive portion).

The mode of determining the drive state of the drive portion can be changed in accordance with a design specification.

The above embodiment is described using an example in which the drive portion is constituted of the solenoid; however, the embodiment is not limited thereto. For example, the drive portion may be constituted of an electric motor (for example, a servomotor or the like). The configuration mode of the drive portion can be changed in accordance with a design specification.

The above embodiment is described using an example in which the determination portion constitutes the control device; however, the embodiment is not limited thereto. For example, all or some of the processes performed by the control device may be performed by recording a program for realizing all or some of the functions of the control device on a computer-readable recording medium and causing a computer system to read and execute the program recorded on the recording medium. The "computer system" mentioned here is assumed to include an OS or hardware such as peripheral devices. Further, the "computer system" is assumed to also include a WWW system including a home page-providing environment (or a display environment). Further, the "computer-readable recording medium" is a portable medium such as a flexible disc, a magneto-optical disc, a ROM, or a CD-ROM or a storage device such as a hard disk contained in the computer system. Further, the "computer-readable recording medium" is assumed to include a medium that retains a program for a given time such as a volatile memory (RAM) in a computer system serving as a server or a client when a program is transmitted via a network such as the Internet or a communication circuit such as a telephone circuit.

Further, the program may be transmitted from a computer system that stores the program in a storage device or the like to another computer system via a transmission medium or by transmission waves in a transmission medium. Here, the "transmission medium" that transmits the program is a medium that has a function of transmitting information, such as a network (communication network) such as the Internet or a communication circuit (communication line) such as a telephone circuit. Further, the program may be a program for realizing some of the functions described above. Further, the program may be a program in which the functions described above can be realized in combination with a program which has already been recorded in a computer system, that is, a so-called a differential file (differential program).

Although preferred embodiments of the present invention have been described, the present invention is not limited to the embodiments. Additions, omissions, substitutions, and other modifications of the configuration can be made without departing from the scope of the present invention, and the modification examples described above can be also appropriately combined.

What is claimed is:

1. A flight vehicle comprising:

a flight vehicle main body; and a landing leg configured to transition between a storage state, in which the landing leg is stored to a position along the flight vehicle main body, and an expansion state, in which the landing leg is expanded to a position away from the flight vehicle main body, wherein the flight vehicle main body comprises a first protrusion that protrudes from part of the flight vehicle main body, the landing leg comprises a second protrusion that protrudes from part of the landing leg, in the storage state, the first protrusion and the second protrusion are positioned to face each other along a facing direction extending outwardly from the flight vehicle main body, the first protrusion is rotatable about a predetermined axis, and the facing direction of the first protrusion and the second protrusion is substantially parallel to the predetermined axis.

2. The flight vehicle according to claim 1, wherein facing between the first protrusion and the second protrusion is released by the first protrusion rotating about the predetermined axis.

3. The flight vehicle according to claim 1, wherein the first protrusion and the second protrusion overlap each other when seen from a direction along the predetermined axis in the storage state.

4. The flight vehicle according to claim 1, comprising:

a frame on an outer portion of the flight vehicle main body, wherein the first protrusion and the second protrusion face each other at a further outer side than the frame with respect to the flight vehicle main body in the storage state.

5. The flight vehicle according to claim 4, comprising:

a drive portion that drives the first protrusion directly above the frame.

6. The flight vehicle according to claim 5, wherein in the storage state, an electric power is not supplied to the drive portion.

7. The flight vehicle according to claim 5, comprising:

a lever that comprises the first protrusion and is configured to be rotatable by a drive force of the drive portion.

8. The flight vehicle according to claim 7, wherein part of the lever is formed in a shape along the frame directly above the frame.

9. The flight vehicle according to claim 7, comprising:

a bias member that biases the lever such that facing between the first protrusion and the second protrusion is maintained in the storage state.

10. The flight vehicle according to claim 7, comprising:

a limit switch that detects an operation of the lever, wherein part of the limit switch is formed in a shape along the frame.

11. The flight vehicle according to claim 10, wherein the lever comprises: a first arm on which the first protrusion is provided; and a second arm that is provided so as to be contactable with the limit switch.

12. The flight vehicle according to claim 10, comprising:

a detection portion that detects a current value of the drive portion; and a determination portion that determines a drive state of the drive portion based on a detection result of the detection portion.

13. The flight vehicle according to claim 12, wherein the determination portion determines the drive state of the drive portion based on each of a detection result of the limit switch and a detection result of the detection portion.

14. The flight vehicle according to claim 5, wherein the drive portion is constituted of a solenoid.

15. The flight vehicle according to claim 1, wherein, in the storage state, the first protrusion and the second protrusion are positioned to engage each other, wherein the facing direction extends through respective points of engagement of the first protrusion and second protrusion with one another.

16. The flight vehicle according to claim 1, wherein respective faces of the first protrusion and the second protrusion, which faces are conformed to one another, are configured to separate from one another upon rotation of the first protrusion about the predetermined axis, thereby enabling the expansion state of the landing leg.

17. The flight vehicle according to claim 1, comprising:

a drive portion that drives the first protrusion;

a lever configured to be rotatable by a drive force of the drive portion; and a limit switch that detects an operation of the lever, wherein the lever includes: a first arm on which the first protrusion is provided; and a second arm that is provided so as to be contactable with the limit switch, and when the storage state of the landing leg is released, by a plunger of the drive portion that drives the first protrusion coming into contact with the second arm, the lever is rotated to release a facing between the first protrusion and the second protrusion, and the second arm comes into contact with the limit switch to operate the limit switch.

18. A flight vehicle comprising:

a flight vehicle main body; and a landing leg configured to transition between a storage state, in which the landing leg is stored to a position along the flight vehicle main body, and an expansion state, in which the landing leg is expanded to a position away from the flight vehicle main body, wherein the flight vehicle main body comprises a first protrusion that protrudes from part of the flight vehicle main body, the landing leg comprises a second protrusion that protrudes from part of the landing leg, in the storage state, the first protrusion and the second protrusion are positioned to face each other in a facing direction extending outwardly from the flight vehicle main body, and the first protrusion is driven by a drive portion that is arranged at an inside of the flight vehicle main body such that the drive portion partially overlaps an outer extent of the flight vehicle main body, the first protrusion is rotatable about a predetermined axis, and the facing direction of the first protrusion and the second protrusion is substantially parallel to the predetermined axis.

19. The flight vehicle according to claim 18, wherein part of a lever including the first protrusion and a limit switch are provided along the outer extent of the flight vehicle main body at the inside of the flight vehicle main body.

20. A flight vehicle comprising:

a flight vehicle main body; and a landing leg configured to be capable of transitioning between a storage state in which the landing leg is stored to a position along the flight vehicle main body and an expansion state in which the landing leg is expanded to a position away from the flight vehicle main body, wherein the flight vehicle main body comprises a first protrusion that protrudes from part of the flight vehicle main body and protrudes in a first direction which is a direction away from the flight vehicle main body, the landing leg comprises a second protrusion that protrudes from part of the landing leg and protrudes in a second direction which is a direction approaching to the flight vehicle main body in the storage state, the first protrusion and the second protrusion face each other in a direction away from the flight vehicle main body in the storage state, the first protrusion is rotatable about a predetermined axis, and the first direction and the second direction are substantially parallel to the predetermined axis.

* * * * *